United States Patent [19]
Montalvo et al.

[11] Patent Number: 5,868,233
[45] Date of Patent: Feb. 9, 1999

[54] MODULAR BRAKES WITH REPLACEABLE FRICTION PADS

[75] Inventors: Edwin J. Montalvo, Freeport; Philip R. Metcalf, Jr., Wyndham, both of Me.

[73] Assignee: The Montalvo Corporation, Portland, Me.

[21] Appl. No.: 800,520

[22] Filed: Feb. 19, 1997

[51] Int. Cl.$^6$ .............................. F16D 13/60; F16D 55/18; F16D 65/095

[52] U.S. Cl. ................................ 192/107 R; 188/1.11 W; 188/73.32; 188/370; 192/30 W

[58] Field of Search ............................ 192/70.13, 107 R, 192/30 W; 188/73.32, 73.34, 370, 1.11 W, 218 XL, 73.2

[56] References Cited

U.S. PATENT DOCUMENTS

| | | | |
|---|---|---|---|
| 2,915,147 | 12/1959 | Davis | 188/73.32 |
| 2,926,757 | 3/1960 | Armstrong | 188/307 X |
| 3,584,717 | 6/1971 | Suppes et al. | |
| 3,613,851 | 10/1971 | Ely et al. | 192/107 R |
| 3,696,900 | 10/1972 | Montalvo | |
| 3,724,624 | 4/1973 | Le Blanc et al. | 192/107 R |
| 3,738,457 | 6/1973 | Dowell | 192/107 R X |
| 3,964,583 | 6/1976 | Montalvo, Jr. | |
| 4,745,992 | 5/1988 | Lusa | 188/1.11 W |
| 5,178,235 | 1/1993 | Montalvo et al. | 192/70.13 X |
| 5,299,663 | 4/1994 | Kobayashi et al. | 188/1.11 W |

*Primary Examiner*—Rodney H. Bonck
*Attorney, Agent, or Firm*—Morgan & Finnegan, L.L.P.

[57] ABSTRACT

Generally trapezoid-shaped friction material pads can be used in conjunction with piston assemblies having torque collars with upstanding torque posts and with torque collars that have torque legs with inclined inner faces or shoulders to embrace side faces or shoulders of the pads. A retainer clip cooperates with the torque legs to prevent unwanted radial movement of the pad. A back plate of the pad has one or more tabs projecting beyond a wider base of the pad for facilitating pad removal. Tabs on the pad for indicating that a worn friction pad is due for replacement are located beyond the wider base of the pad or within the friction material pad. The friction pads are adapted for installation on module bases which include air ports on side surfaces and are constructed for interconnection that provides for air transfer between adjacent modules via the air ports. A piston assembly for applying the friction pads in a braking operation includes an indexing mechanism to align and secure the friction pads to the piston assembly.

29 Claims, 11 Drawing Sheets

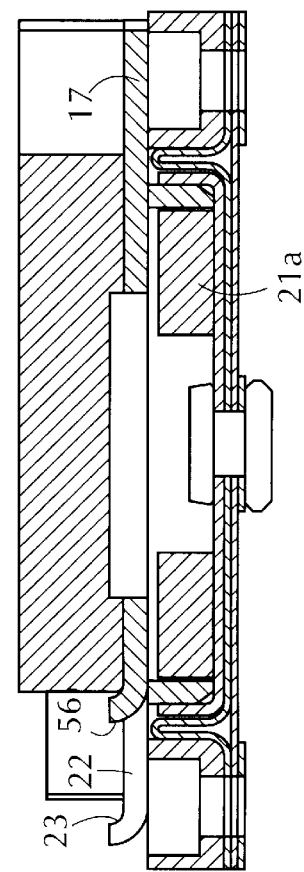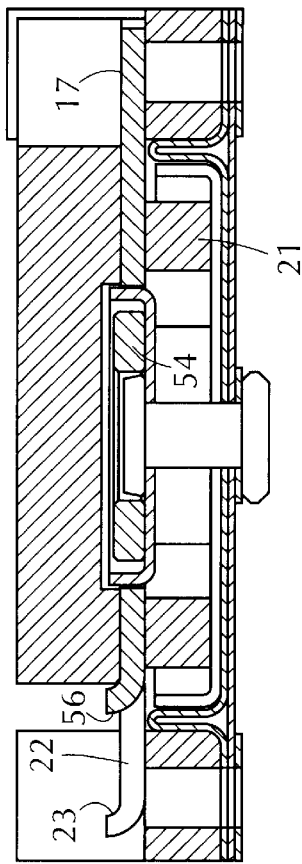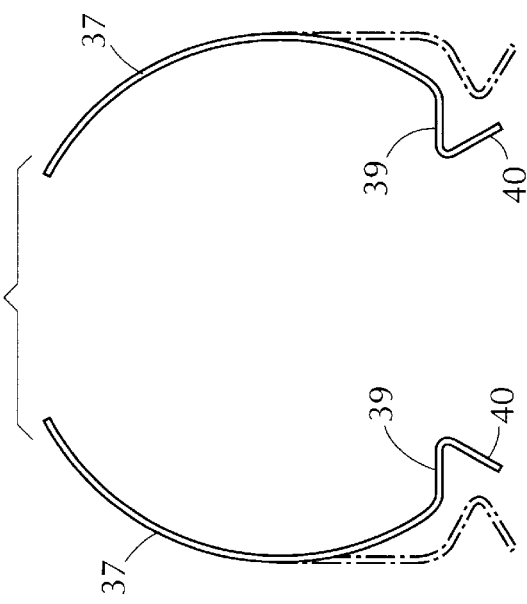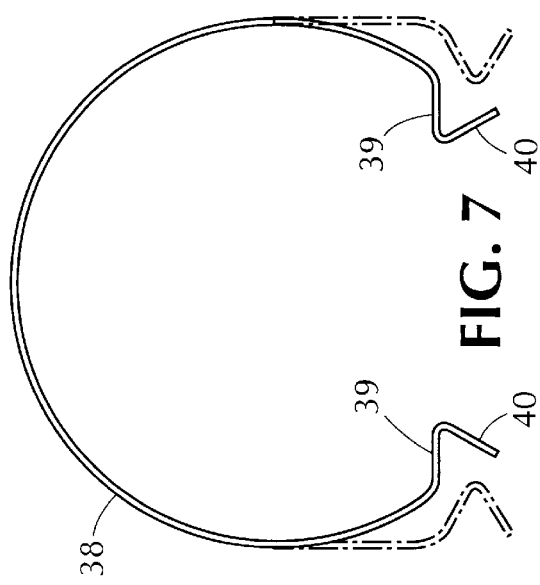

MODULAR BRAKES WITH REPLACEABLE FRICTION PADS

BACKGROUND OF THE INVENTION

1. Field of the Invention

The invention relates to the use of easily removable and replaceable friction material pads in friction coupling mechanisms and to modular assemblies employing such friction material pads.

2. Discussion of the Prior Art

The applicants' U.S. Pat. No. 5,178,235, granted Jan. 12, 1993, and entitled "Modular Brakes and Clutches", the disclosure of which is hereby incorporated in its entirety by reference, describes pneumatically actuated piston and cylinder assemblies for urging friction material into contact with a disc that is rotatable relative to the body which carries the piston and cylinder assemblies. U.S. Pat. No. 3,964,583, granted Jun. 22, 1976, entitled "Mounting of Cylinders in Friction Brakes and Clutches", describes friction brakes and clutches having pivotable or dismountable pods carrying friction material pads, and shows the use of interchangeable parts. Pivoted mounting systems for frictional brakes and clutches are also shown and described in U.S. Pat. No. 3,584,717, granted Jun. 15, 1971 and U.S. Pat. No. 3,696,900, granted Oct. 10, 1972.

SUMMARY OF THE INVENTION

A friction material pad according to the present invention is shaped to cooperate with different piston assembly structures, so that the friction material pad is usable in prior existing brakes and clutches as well as in conjunction with piston and cylinder assemblies especially adapted for use with the friction material pad.

The friction material pad is generally trapezoidal or keystone-shaped in plan, so that in use in a brake or clutch the wider base of the generally trapezoidal-shaped friction material pad is closer to the perimeter of a relatively rotating disc while the narrower base of the pad is closer to the disc's axis of rotation. This arrangement provides good braking frictional contact and results in more even distribution of force and frictional wear of the outer face of the pad. The radially outwardly widening shape of the pad provides more efficient distribution of frictional force, and hence of wear on the pad, than other possible pad shapes, as well as allowing for easier removability to the pad.

The friction material of the pad is secured, preferably by an adhesive, to a flat back plate, which can be formed of steel, and is removably held at the front of a pneumatically activated piston by means of a magnet. The pad is restrained from transverse movement by torque posts projecting from a torque collar or by a pair of generally segment-shaped legs that extend forward from the torque collar to embrace opposite sides of the pad. In the latter arrangement, a one-piece or two-piece retainer clip, which can be of steel, prevents radial movement of the pad, but permits easy removal of the pad for inspection or pad replacement. The torque collar can have contouring matched to that of the clip and the friction pad to provide for positive retention of the clip and accurate positioning of the pad.

Tab members of the friction material pad back plate extend beyond the wider base of the friction material, allowing easy sliding removal of the pad by hand, without the need of any kind of tool, when a torque post has been removed or the clip means have been opened, for pad inspection or replacement.

The modular friction coupling mechanism of the invention, with its readily removable friction material pad, can be used to retrofit existing equipment or installed as original equipment for use in a wide range of industrial applications, including web processing operations and paper manufacturing.

In one embodiment, a friction pad is secured in a collar and the collar and pad are coupled to a module base which is usable in different size brake assemblies. The module includes contoured sides having air ports and associated air passageways which lead to a central piston assembly. In a braking assembly, a module is interconnected to an adjacent module for providing air transfer between the modules by mating an air port on one module to an air port on the adjacent module.

In another embodiment, a portion of the plate to which a friction pad is attached includes a counter bore in the surface that is to face a piston assembly. The bore allows for indexing of the pad by an indexing mechanism on the piston assembly to maintain alignment of and prevent movement of the pad relative to the piston assembly.

BRIEF DESCRIPTION OF THE DRAWINGS

In the accompanying drawing figures, in which like reference characters indicate like parts.

FIG. 4 is a side view in section showing the relationship of the piston and friction material pad in one preferred embodiment of the invention.

FIG. 5 is a view similar to that of FIG. 4 illustrating another embodiment of the invention.

FIG. 6 shows a two part clip for retaining a friction material pad in accordance with the invention.

FIG. 7 shows a one-piece retaining clip in accordance with the invention.

DETAILED DESCRIPTION OF PREFERRED EMBODIMENTS

Figure 1:
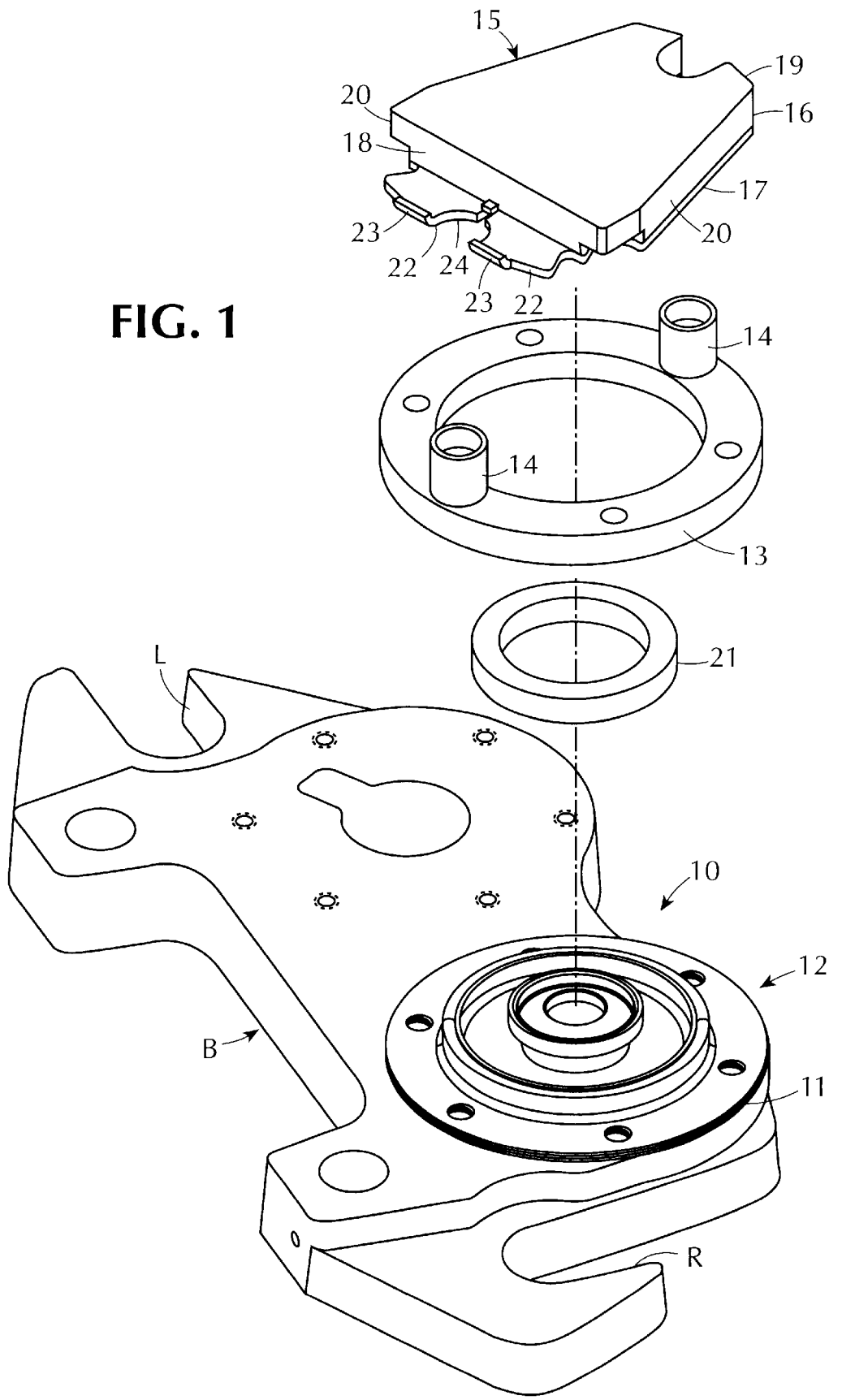
FIG. 1 is an exploded view of a friction module showing a piston and cylinder assembly with the friction material pad of the invention and a module body adapted for mounting in a brake or clutch of the type generally shown in U.S. Pat. No. 3,964,583.

FIG. 1 shows a friction member carrying pod or module B of the type generally described and shown in U.S. Pat. No. 3,964,583. The pod B, which can be an aluminum casting, has mutually perpendicular slots L and R at its opposite ends for pivotable and removable movement of the pod B with respect to mounting pins (not shown). When mounted in a brake the side of the pod B shown uppermost in FIG. 1 faces a relatively rotatable disc so that upon actuation of the piston of a piston and cylinder assembly carried by the pod B, a friction material pad is thrust into contact with the opposed surface of the disc for exerting frictional force on the disc to stop relative rotation of the disc. The operation of such brakes has been described in U.S. Pat. Nos. 3,584,717; 3,696,900; 3,964,583 and 5,178,235. The pod B shown in FIG. 1 can support two piston and cylinder assemblies but for simplicity, a single piston and cylinder assembly generally designated by the reference numeral 10, is illustrated in FIG. 1. The piston and cylinder and the friction material pad of the invention can also be used in a clutch.

The piston and cylinder assembly 10 shown in FIGS. 1 and 5 generally comprises a cylinder base plate 11, a piston assembly 12 shown as a diaphragm-type piston assembly, a torque collar 13 and a pair of upstanding cylindrical torque posts 14. Screws (not shown in FIG. 1) secure the torque posts 14, torque collar 13, piston assembly 12 and cylinder base plate 11 to the pod B.

The torque posts 14, shown spaced 180 degrees from each other on the torque collar 13, prevent transverse movement of the friction material pad generally designated by reference numeral 15. The pad 15, which is generally trapezoidal in plan, comprises a compact mass of wear and heat resistant organic and/or synthetic friction material 16, and which can be fibrous materials which is secured, preferably by means of an adhesive, to a back plate 17 which is preferably a steel plate. The pad 15 is flat with a flat upper friction surface and generally trapezoidal or keystone shaped, with a wider base 18 and a narrower base 19 and side faces 20 inclined toward each other.

FIG. 1 also shows a permanent magnet 21, which is ring-shaped and is preferably made of a heat resistant ceramic composite magnetic material, which fits concentrically about the forward face of the piston assembly 12 and serves to hold the friction material pad back plate 17, and hence the friction material pad 15, releasably in place.

When air under pressure is admitted into the chamber of the cylinder of the piston and cylinder assembly 10, the piston 12 moves forward (upward in the sense of FIG. 1) to urge the front surface of the pad friction material 16 into frictional contact with a friction disc that is rotatable relative to the piston and cylinder assembly, exerting braking force on the relatively rotatable disc. In the embodiment of FIG. 1 wherein the piston and cylinder assembly 10 represents one of two such assemblies carried by the pod B, the slots L and R of the pod B permit the removable mounting of the pad on a suitable fixture so that the device functions as a brake, or on an element which is itself rotatable so that the device serves as a clutch.

This arrangement permits ease of inspection and replacement of worn parts, particularly worn friction material pads 15, by swinging the pod B outwardly about one of its ends, or removing the pod B from the fixture or element to which the pod is attached by means of mounting bolts (not shown) to gain access to the piston and cylinder assembly 10. The friction pad 15 can then be inspected and if it is necessary or desirable, the pad 15 can be removed.

To facilitate removal of the friction material pad 15, pull tab members 22 extend radially outward from the pad back plate 17 beyond the wider base 18 of the pad 15. The pull tabs 22 are preferably integrally formed extensions of the flat back plate 17. The pull tabs 22 preferably have upturned lips 23 to facilitate grasping for sliding outward movement of the pad 15 after removal of the outer torque post 14 that extends between the pull tabs 22. As shown in FIG. 1, the inner edges of the pull tabs 22 have arcuate portions 24 which are shaped to fit closely around the cylindrical torque post 14 when the device of the embodiment of FIG. 1 is in its assembled condition.

Figure 2:
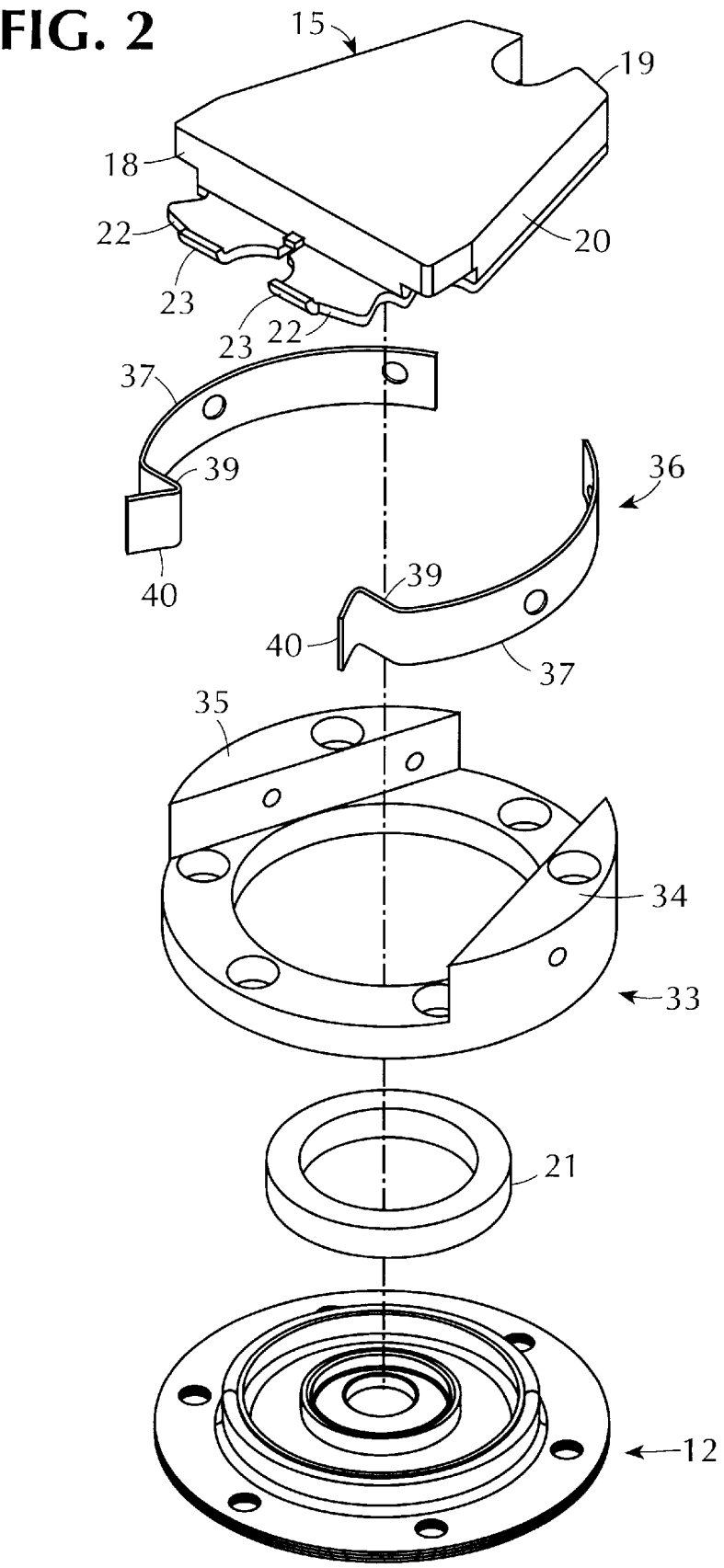
FIG. 2 is an exploded view showing the interrelationship of parts in a preferred embodiment of the piston according to the invention.

FIGS. 2, 3, 4, 10 and 11 show another embodiment of the device of the invention, in which the friction material pad 15 is held against transverse movement by means that differ from the torque post 14 shown in FIG. 1. In the embodiment of FIG. 2 a torque collar 33 has two upstanding torque legs 34 and 35 which are preferably shaped in plan as segments of the circle that defines the circumference of the torque collar 33. Like the torque collar 13 of FIG. 1, the torque collar 33 has a plurality of holes for receiving screws for attachment to the cylinder, and in the case of the torque collar 33, two of the screw receiving holes are shown passing through the torque legs 34 and 35. The inner faces 34a, 35a of the legs 34, 35 are inclined toward each other at an angle corresponding to the angle defined by the sides 20 of the trapezoid-shaped friction material pad 15 so that the pad 15 is received snugly between the torque legs 34 and 35, with the inner faces 34a and 35a in contact with the sides 20 of the pod.

Figure 3:
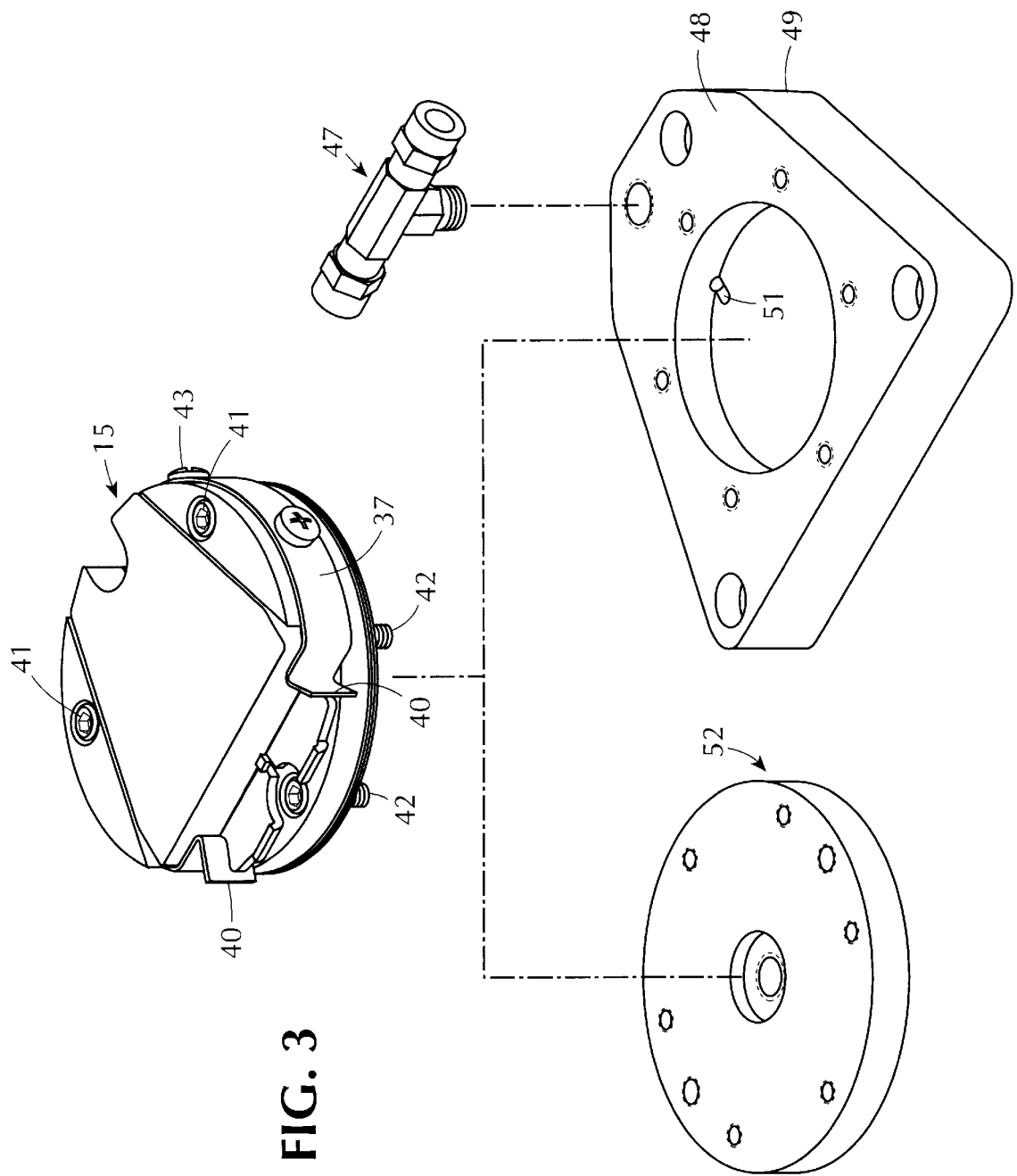
FIG. 3 shows the piston of FIG. 2 with the parts assembled as well as cylinder parts according to the invention.

When the torque collar of the embodiment of FIGS. 2, 3, 4, 10 and 11 is used, there is no need to remove a torque post to slide the friction material pad 15 out of its working location, as is the case with the torque collar of FIG. 1, which makes the embodiment of FIG. 2 preferable for some applications. Instead of being held against radial outward movement by a torque post, the friction material pad 15 in the embodiment shown in FIGS. 2, 3 and 4 is restrained by a retainer clip 36 of springy material, such as stainless spring steel, which can be a two-piece clip consisting of a pair of identical retainer clip members 37 as shown in FIGS. 2 and 6 or a one-piece retainer clip consisting of a continuous band 38 as illustrated in FIG. 7. The retainer clips 36 of both the FIGS. 2 and 6 and FIG. 7 embodiments have holes for attachment of the clip 36 at the outer faces of the torque legs 34, 35 by means of screws, shown in FIG. 3, passing through the retainer clips to aligned threaded holes in the legs 34, 35.

Near the open outer end of the retainer clip 36 there are inward bent portions 39 aligned essentially along a chord of the circle defined by the curved portions of the retainer clip 36 to lie in front of the base 18 of the friction material pad 15, securing the pad 15 against unwanted radial movement during operation. To open the retainer clip 36 in order to slide out the friction material pad 15, the outer end portion on each side of the retainer clip 36 is bent back to provide a pair of opposed clip tabs 40 which can be pushed away from each other to spread the clip 36 open so that the pad 15 can be slid out. In a preferred embodiment, the pad 15, can be removed by hand without the need of any kind of tool. The solid lines in FIGS. 6 and 7 show the clip 36 in its pad retaining or closed condition and dot and dash lines show the clip 36 in the open condition that allows sliding removal of the pad 15.

FIG. 3 shows the torque collar 33 of FIG. 2 with the friction material pad 15 in assembled condition with the pad held in place by the torque legs 34, 35 and a two-piece retainer clip 36. Heads 41 of machine screws passing through the torque legs 34, 35, as well as the inner ends 42 of other torque collar machine screws are shown in FIG. 3 which also shows two of the retainer clip screws 43.

Figure 8:
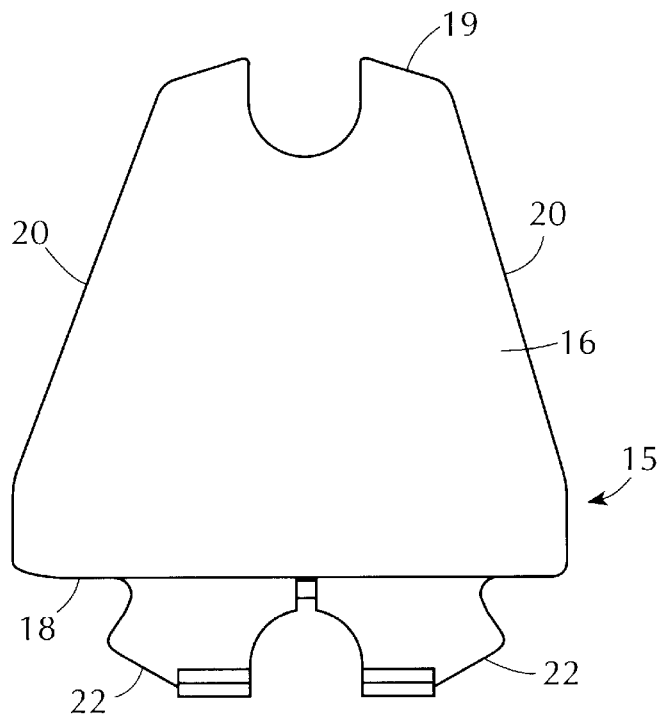
FIG. 8 is a plan view of the friction material pad of the invention.
Figure 9:
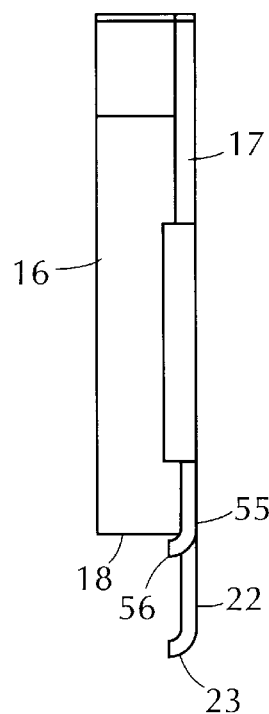
FIG. 9 is a side view of the friction material pad of FIG. 8.

As can be seen in FIGS. 1, 2 and 3 and in the plan view of FIG. 8, the friction material pad 15, while described as generally trapezoidal or keystone-shaped, preferably has a pair radially inward extending portions defining a generally U-shaped recess therebetween arranged to receive the inner one of the two torque posts 14 therebetween when the pad 15 is employed as in the embodiment of FIG. 1, although no torque posts are present in the embodiment of FIGS. 2, 3, 4 and 11. A similar U-shaped recess is provided between the tabs 22 extending beyond the wider base 18 of the friction material 16. The pad shape illustrated economically permits identical pads to be used in any of the embodiments of the invention without significantly reducing the effective friction surface of the pad 15.

Two different types of cylinders with which the piston assemblies 12 of the invention can be used are also illustrated in FIG. 3. It will be understood that while using the friction material pad 15 of the invention in conjunction with a pivotable and removable pod B as shown in FIG. 1 provides not only easy access to the friction material pad 15 for inspection and replacement, but also provides ready access to the piston assembly 12, access to the friction material pad 15 does not require the use of a pivotable or easily removable pod such as the pod B shown in FIG. 1.

The piston assembly 12 can be used with a cylinder 46 as shown at the lower right in FIG. 3, for example, in brakes and clutches of the general type shown and described in U.S. Pat. No. 5,178,235. The cylinder 46, unlike the cylinders shown in U.S. Pat. No. 5,178,235, has a fitting 47 for providing thereto a supply of air under pressure, the fitting 47 being attached at the forward face 48 of the cylinder body 49, rather than an air supply fitting located beneath the cylinder as shown in U.S. Pat. No. 5,128,235. A passage through the body 49 of the cylinder 46 delivers air to the cylinder chamber 50 through the inlet port 51. The body of the cylinder 46 is shown as generally wedge shaped so that a plurality of cylinders can be disposed around a disc-shaped mounting plate or on a spider for greater frictional contact. The cylinder 52 shown at the lower left of FIG. 3 is of the kind shown in U.S. Pat. No. 5,178,235, to which air under pressure is supplied through the bottom of the cylinder 52 from below the piston assembly 12.

FIGS. 4 and 5 illustrate two embodiments of the piston assembly 12 according to the invention. It will be seen that both embodiments employ ring-shaped magnets, the magnet ring 21a shown in FIG. 4 having a rectangular cross-section, whereas the magnet 21 shown in FIG. 5 is generally square in section. The piston assembly shown in FIG. 4 corresponds to that of FIGS. 2, 3, 10 and 11, whereas the piston assembly of FIG. 5 is for use in association with torque posts 14 as shown in FIG. 1. As shown in FIG. 5, a smaller ring-shaped permanent magnet 54 can also be used to hold the pad 15 in place.

FIGS. 4, 5, 8 and 9 also show that the friction material pad's metal back plate 17, in addition to having the pull tabs 22, can advantageously also be provided with a central tab 55 with an upturned lip 56. The central tab 55 produces a warning noise when the friction material 16 of the friction material pad has been so reduced in thickness by wear that the lip 56 of the tab 55 comes into contact with a relatively rotating friction disc when the piston is advanced, signaling that the pad 15 should be replaced. It will be understood that, in a preferred embodiment, the upturned lips 23 of the pull tabs 22 never contact the relatively rotating disc because of their location beyond the circumference of the friction disc, whereas the upturned lip 56 of the tab 55 is located within the relatively rotatable friction disc's circumference. The upturned lip 56 of tab 55 is thus preferably positioned closely adjacent the wider base 18 of the generally trapezoidal mass of friction material 16.

Figure 10:
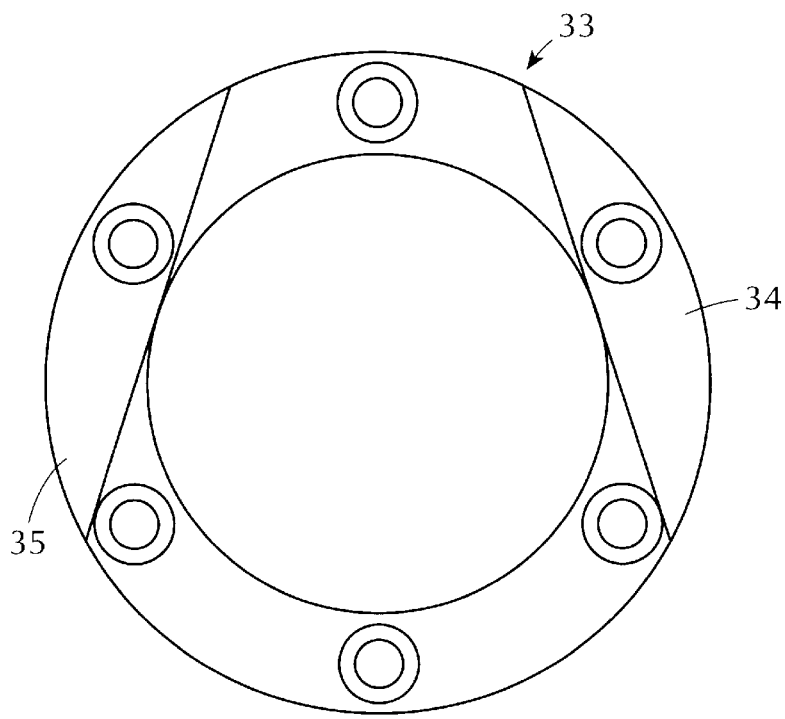
FIG. 10 is a plan view of a torque collar for receiving the friction material pad of FIGS. 8 and 9.
Figure 11:
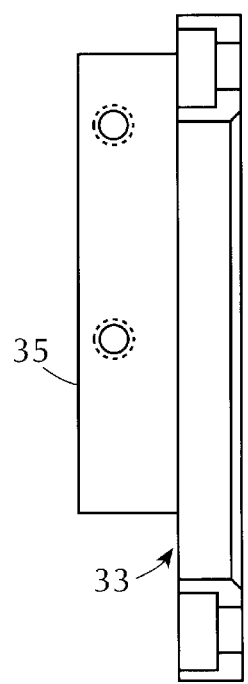
FIG. 11 is a side view of the torque collar of FIG. 10.

FIG. 10, a view in plan of the torque collar 33 of FIGS. 2, 3 and 4, with its torque legs 34 and 35 shows that the flat inner faces of the torque legs 34 and 35 are inclined toward each other in the radially inward direction at an angle of about 30° to about 45° and preferably of about 33° to about 34°, essentially corresponding to the angle defined by the side faces 20 of the trapezoid-shaped friction material pad 15.

The friction material of the pad 15 is suitably free of asbestos and may be formed of a graphite-based material, or of Kevlar, or of a composite material that is non-toxic and resistant to wear and high temperature. The torque collars 13 and 33 may suitably be fabricated of aluminum or of a thermoplastic composite or other high strength plastic material. Structural parts of the piston assembly 12 may be fabricated of metal or of a rigid thermoplastic material.

Figure 12:
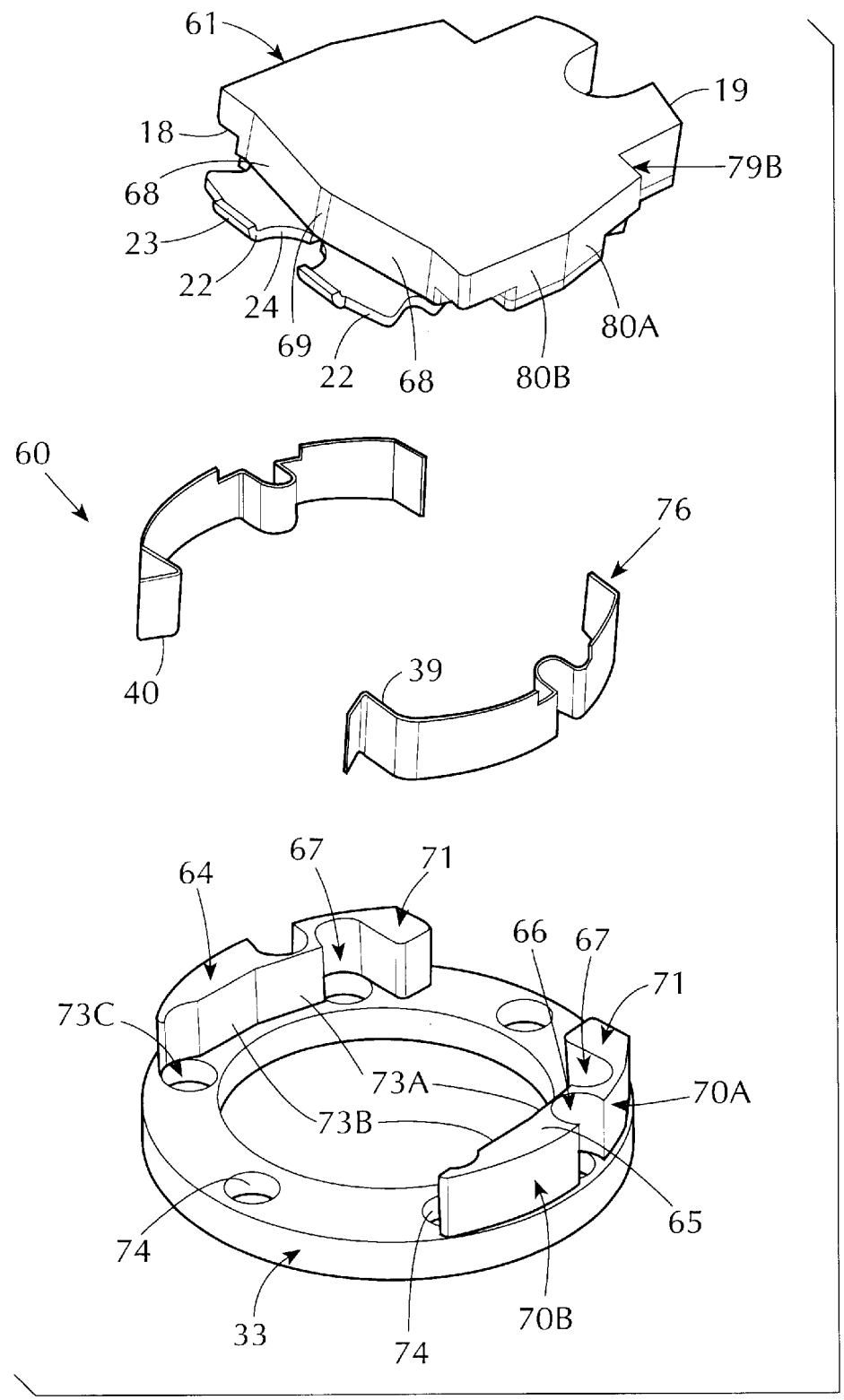
FIG. 12 is an exploded view of a friction pad module with a friction material pad showing the interrelationship of parts in another preferred embodiment according to the invention.
Figure 13A:
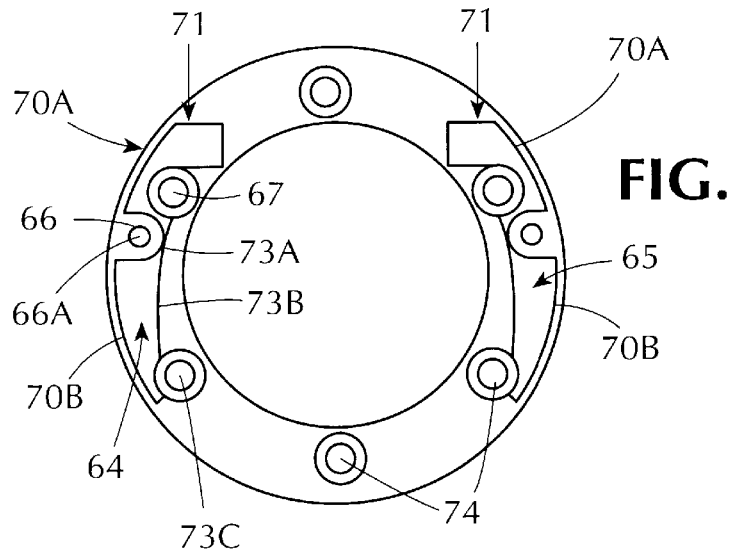
FIG. 13A shows a plan view of the torque collar of FIG. 12.
Figure 13B:
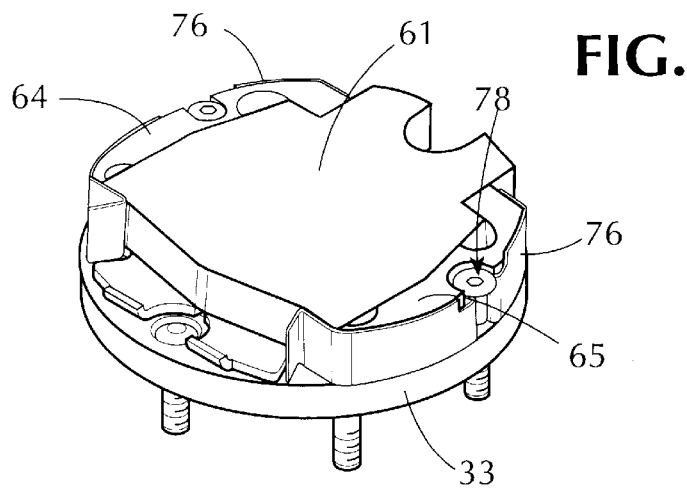
FIG. 13B shows a side view of the parts of FIG. 12 assembled according to the present invention.
Figure 13C:
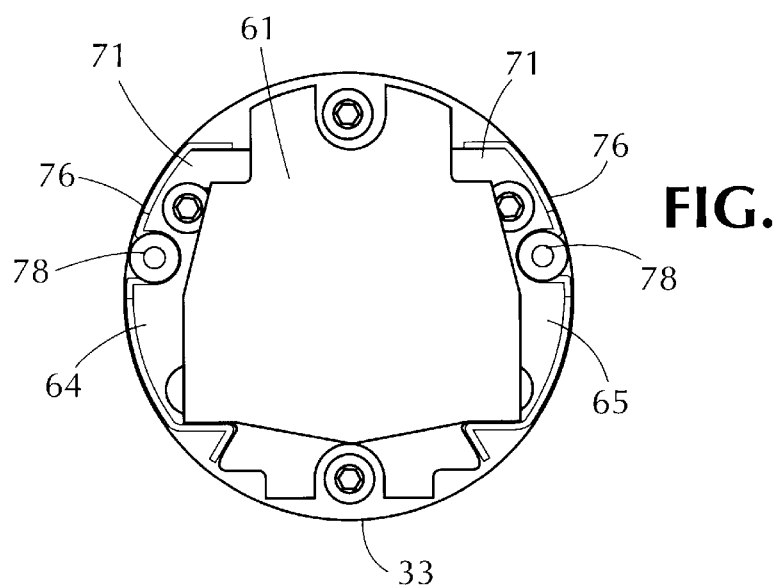
FIG. 13C shows a plan view of the parts of FIG. 12 assembled according to the present invention.
Figure 14:
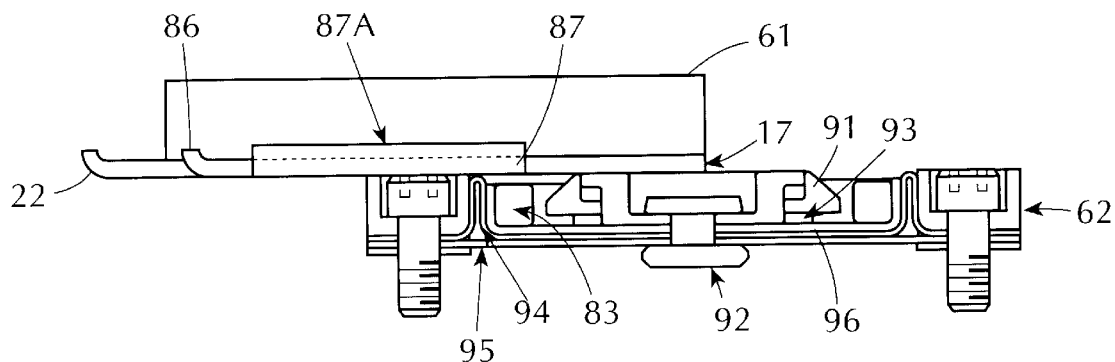
FIG. 14 is a side view in section showing the relationship of a friction material pad and a piston assembly engaged with a friction pad module prior to installation of the pad in the module in another preferred embodiment of the invention.
Figure 15A:
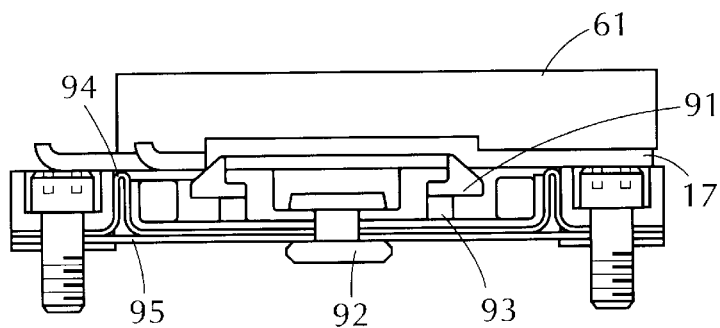
FIG. 15A is a side view in section of the parts of FIG. 14 showing the relationship of the piston assembly and the friction module with a friction material pad installed in the module where the piston is not actuated.
Figure 15B:
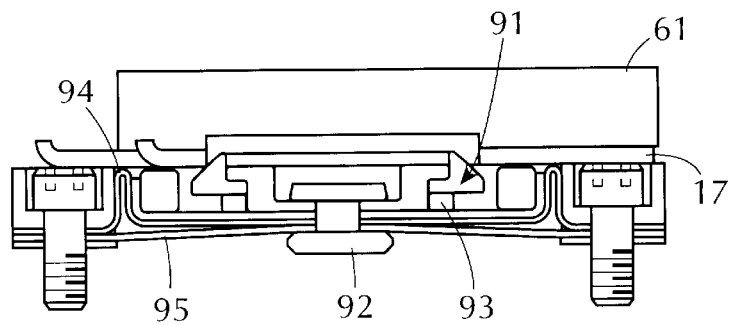
FIG. 15B is a side view in section of the parts of FIG. 14 showing the relationship of the piston assembly and the friction module with a friction material installed in the module pad where the piston is actuated.

FIGS. 12, 13A, 13B and 13C show a further embodiment of the invention in which a friction material pad 61 is received in a friction module 60 which is adapted for installation onto a piston assembly 62, as shown in FIGS. 14, 15A and 15B. Like reference numerals are used to refer components described in detail above. Referring to FIG. 12, the pad 61, similar to the pad 15, includes the elements 18, 19, 22, 23 and 24. The pad 61 also includes a pair of shoulders 79B which connect the ends of the narrower base 19 to flat, inclined outer surface sides 80A. Flat, inclined outer surface sides 80B extend from the sides 80A to the wider base 18. The base 18 of the pad 61 also includes inclined segments 68 which extend from the side ends of the base 18 to an interconnecting segment 69.

Referring to FIGS. 12, 13A, 13B and 13C, the pad 61 is received between two upstanding torque legs 64 and 65, which are attached to and define portions of the circumference of a torque collar 33. The legs 64, 65 are preferably identical in construction and are attached symmetrically to each other on the collar 33 so that their inner faces oppose each other. For simplicity, only the leg 65 is described in detail below.

The leg 65 includes a shoulder 71 at its topmost portion which extends inward toward the center of the collar 33. The outer face of the leg 65 includes an inclined ridge arc segment 70A which extends downward from the shoulder 71 along the circumference of the collar 33 and terminates at a slot 66. An arc segment 70B extends from the slot 66 along the circumference of the collar 33 to the bottom of the leg 65. The inner face of the leg 65 includes a recess 67 which is defined on one side by the inner face of the shoulder 71 and the other side by an inclined segment 73A. An inclined segment 73B, inclined at a greater angle towards the center of the collar 33 than the segment 73A, extends from the segment 73A towards the bottom of the leg 64 and terminates at a recess 73C. The recesses 67 and 73C of the leg 65 are aligned with mounting holes 68 in the collar 33. The inner surface of the shoulder 71 and the surfaces of the segments 73A and 73B are inclined to correspond to the angular contours of the shoulder 79B and the outer surface sides 80A and 80B of the friction material pad 61 to provide for accurate positioning of the pad 61 between the torque legs 64 and 65, where the segments 73A, 73B and the shoulder 71 are in contact with the sides 80A and 80B and the shoulder 79B of the friction pad 61, respectively.

Referring to FIGS. 12, 13B and 13C, the module 60 includes a pair of identical retainer clip members 76, made of the same material as the clip 36 described above. The clip members 76 include the elements 39 and 40 and operate in the same manner as described above for the clips 36 for holding the pad 61 in place within the collar 33. The clip members 76 are adapted to include sides which have contours shaped inverse to those of the outer faces of the legs 64, 65 and of the shoulder 71 and the base 18 portions of the pad 61 to provide for positive retention of the clip members 76 to the legs 64, 65 at the outer diameter of the collar 33 for securing the pad 61 in the module 60.

When the pad 61 is secured in the assembly 60 using the clips 76, button head fasteners 78, as shown in FIGS. 13B and 13C, are received through the slots 66 in the legs 64, 65 and fastened in holes 66A, which are bored in the collar 33, for further securing the clips 76 in the positive retention position. The fasteners 78 also allow for easy removal of the clips 76 and access to the component parts of the assembly for maintenance. Further, the segments 68 provide a suitable surface to facilitate removal of the clips 76 by flexing of the tabs 40.

FIGS. 14, 15A and 15B illustrate a preferred embodiment of the piston assembly 62, according to the invention, where the friction module 60 is secured to the piston assembly 62 and adapted to receive the friction pad 61, as described above in connection with FIGS. 12, 13A, 13B and 13C. As shown in FIG. 14, the friction pad 61 is secured to the back plate 17, which is adapted to include a counter bore 87 in its center. The bottom surface of the friction pad 61 may also include a central bore 87A which is aligned with the bore 87.

The piston assembly 62 comprises a ring-shaped ceramic magnet 83 having a square cross-section which is used to hold the pad 61 in place. An index ring 91 having an outer diameter slightly less than the diameter of the bore 87 surrounds a central piston rivet 92 in the piston assembly 62. A leaf spring 95 is coupled to the rivet 92 and a diaphragm 94. The index ring 91 is resiliently engaged to a base support 96 in the piston assembly 62 by a ring-shaped wave spring 93. The index ring 91 includes an outer diameter surface which preferably inclines upwards toward the center of the rivet 92 to provide for indexing of the back plate 17 of the friction pad 61, regardless if the piston assembly 62 is engaged to the friction pad 61 to provide for braking.

As shown in FIG. 14, the pad 61 is installed on the module 60 by sliding the pad 61 over the index ring 91 to result in the shoulders of the pad 61 abutting the shoulders 71 of the legs 64, 65 (not shown), as explained above. During installation of the pad 61 on the module 60, the wave spring 93 is at least partially compressed. After the pad 61 is installed, the bore 87 is substantially aligned with the index ring 91, at which point the wave spring 93 is completely decompressed. When the wave spring 93 fully decompresses, the index ring 91 is biased forward towards the pad 61 and the bore 87 to provide indexing of the friction pad 61, even if the piston assembly 62 is not engaged for braking, as shown in FIG. 15A.

FIG. 15B shows the piston assembly 62 engaged for braking. During braking, the rivet 92 is acted on by air pressure and moves forward to force the leaf spring 95 into the diaphragm 94. The diaphragm 94, when forced forward, contacts the plate 17. The forward movement of the rivet 92 also causes the index ring 91 to move forward into contact with the outer diameter surface of the bore 87, if the ring 91 is not already in partial contact with the outer diameter surface of the bore 87. The indexing during braking holds the friction pad 61 in place and substantially centered, and absorbs forces caused by misalignment of the pad 61 relative to a relatively rotating disc for preventing the friction pad 61 from being dislodged from the module 61 during braking.

Referring to FIGS. 14, 15A and 15B, the friction material pad's 61 back plate 17, in addition to having the pull tabs 22, includes a central tab 85 with an upturned lip 86. The tab 85 is embedded within the pad 61 and positioned within the relatively rotatable friction disc's circumference and closely adjacent to the wider base 18 of the generally trapezoidal mass of the friction material pad 61. The tab 85, like the tab 56, produces a warning noise when the friction material 61 of the friction material pad 61 has been so reduced in thickness by wear that the lip 86 of the tab 85 begins to protrude from the friction material and comes into contact with a relatively rotating friction disc when the piston 92 is advanced forward, signaling that the pad 61 should be replaced.

The inclined surfaces 73A and 73B of the legs of the collar 33 and the corresponding surfaces 80A and 80B of the pad 61 are at suitable angles which ensure that the pad 61's outer surfaces remain tangential to the collar 33 during braking operation. The friction pad 61 remains securely embraced within the collar 33 during brake operation because the sides 80A and 80B of the pad 61 and the inner faces 73A and 73B of the legs 64, 65 are at angles that provide that any transverse force produced on the pad 61 acts on the legs 64, 65 of the collar 33 at an angle exceeding 90 degrees. The pad 61, therefore, does not move in response to any force applied transverse thereto and potentially caused by contact with a relatively rotating disc which is not properly aligned with the pad 61 during braking.

Figure 16:
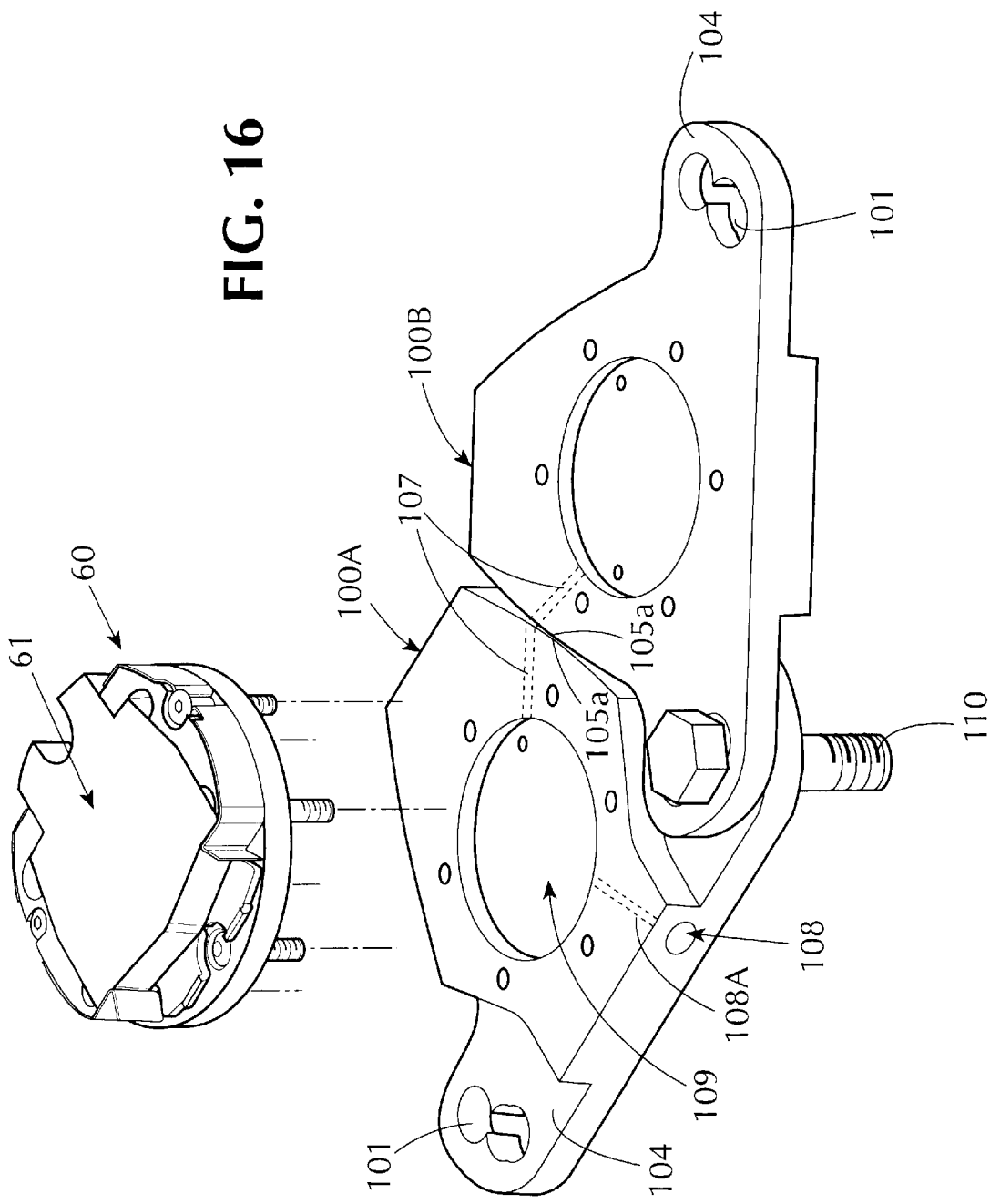
FIG. 16 shows the interrelationship between the parts of FIG. 12 assembled according to the present invention and interlocked friction module base bodies in another preferred embodiment of the invention.
Figure 17A:
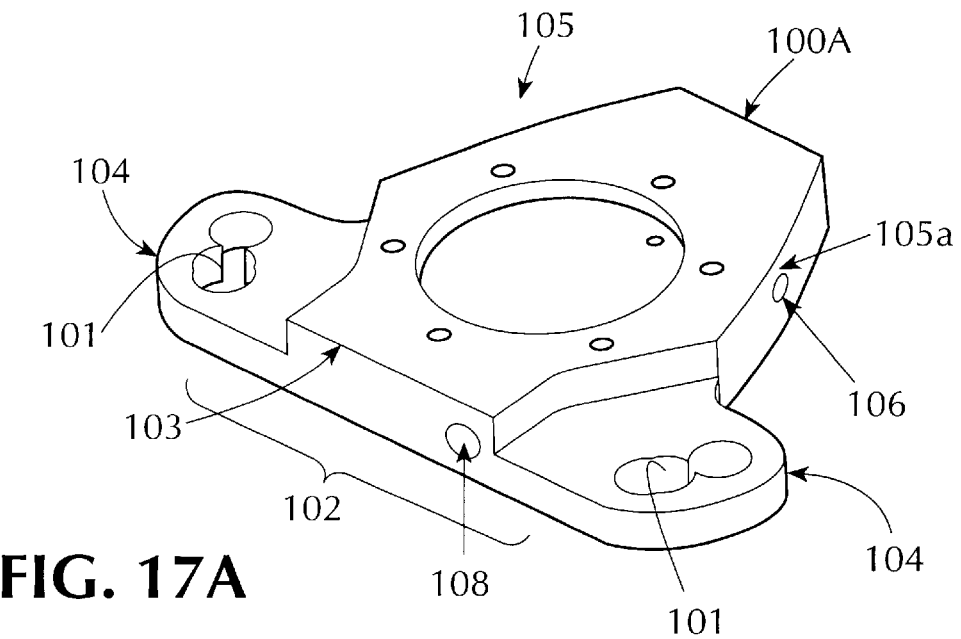
FIG. 17A is a side view of a friction module base of FIG. 16.
Figure 17B:
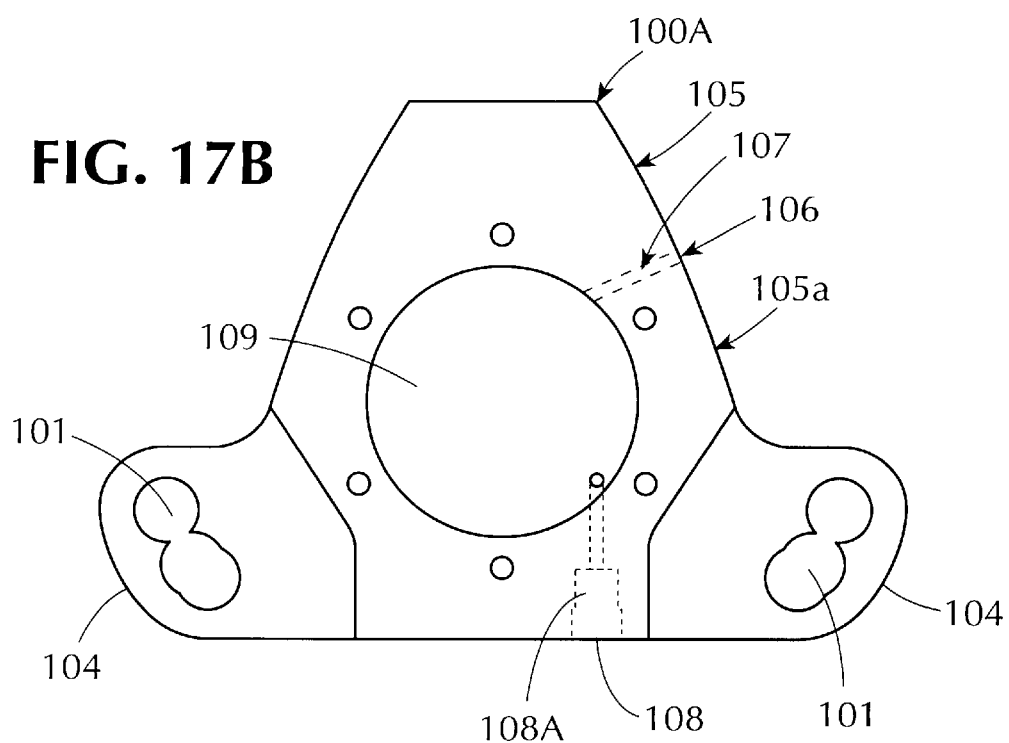
FIG. 17B is a plan view of a friction module of FIG. 16.

FIG. 16 illustrates an exemplary embodiment of substantially similar friction module bases 100A and 100B which can receive the friction module 60 with the friction pad 61 and are coupled in an alternate inverse interlocking arrangement that provides for air transfer therebetween without the use of additional components normally used in the prior art, such as module adapters. Referring to FIGS. 17A and 17B, which show the module 100A in further detail, the module 100A includes a generally trapezoid-shaped base plate 102 having extensions 104 at the side ends of the base plate 102. A top plate 103, preferably integral with the base plate 102, covers the entire base plate 102 except for the extensions 104. The top plate 103 includes inclined outer side surfaces 105, each of which may include an air transfer port 106. For purposes of illustration, the module 100A includes an outer side surface 105a with an air transfer port 106. Referring to FIGS. 16 and 17B, the port 106 is connected to a piston bore 109, which is defined in the center of the module 100A, via a tubing or air passageway 107 which is bored into the module 100A. An air input port 108 at the base of the module 100A is connected to an input air passageway 108A, which also is bored in the module 100A and connects to the bore 109. Upon placement of a piston assembly within the bore 109, a sealed through-connection from the port 106 to the port 108 is obtained. The module base 100B, as shown in FIG. 16, does not include the elements 108, 108A because air for braking operation is supplied to the module base 100B from the port 106 of the adjacent module base 100A when the module bases 100A and 100B are interconnected, as explained below.

The interlocking extensions 104, which are narrower in width than the module base 100A by the width of the top plate 103, include several slotted mounting holes 101. The holes 101 on one extension 104 of the module base 100A are positioned symmetric to the holes 101 on the opposing extension 104 of the module base 100A. The outer surfaces of the top plate 103 facing the extensions 104 are contoured to provide for alternative inverted connection of the module base 100A to the module base 100B, as shown in FIG. 16. Interlocking bolts 110 are received in one of the holes 101 of the module bases 100A, 100B for connecting the module base 100A to the module base 100B in an alternative inverted arrangement where respective inclined surfaces of the module bases 100A and 100B face each other and are flush. This connection arrangement provides for mating of the air transfer ports on the facing inclined surfaces of pairs of adjacent modules. For example, as shown in FIG. 16, the sides 105a of the module bases 100A and 100B are in face-to-face alignment when the bases 100A and 100B are coupled by a bolt 110 at selected holes 101 in the extensions 104 of the respective modules. Alignment of the sides 105a results in mating of the air ports 106 located thereon, thereby creating an air transfer path from the air input port 108 of the module 100A to the bore 109 of the base 100B via the respective mated ports 106 and air passageways 107 of the modules. As a result, air transfer between modules is achieved without the use of air fittings or tubing interconnections. In a preferred embodiment, the ports 106 include pneumatic seals. It is to be understood that a module base may include an air port on one or more of the inclined outer side surfaces and associated air passageways which connect to the piston bore in the module base to facilitate use of the same module base for braking operations involving various sizes of discs. For a module base including multiple ports, a port on a selected side surface which is to contact the side surface of an adjacent module base is the only port on the module which is not sealed.

Figure 18A:
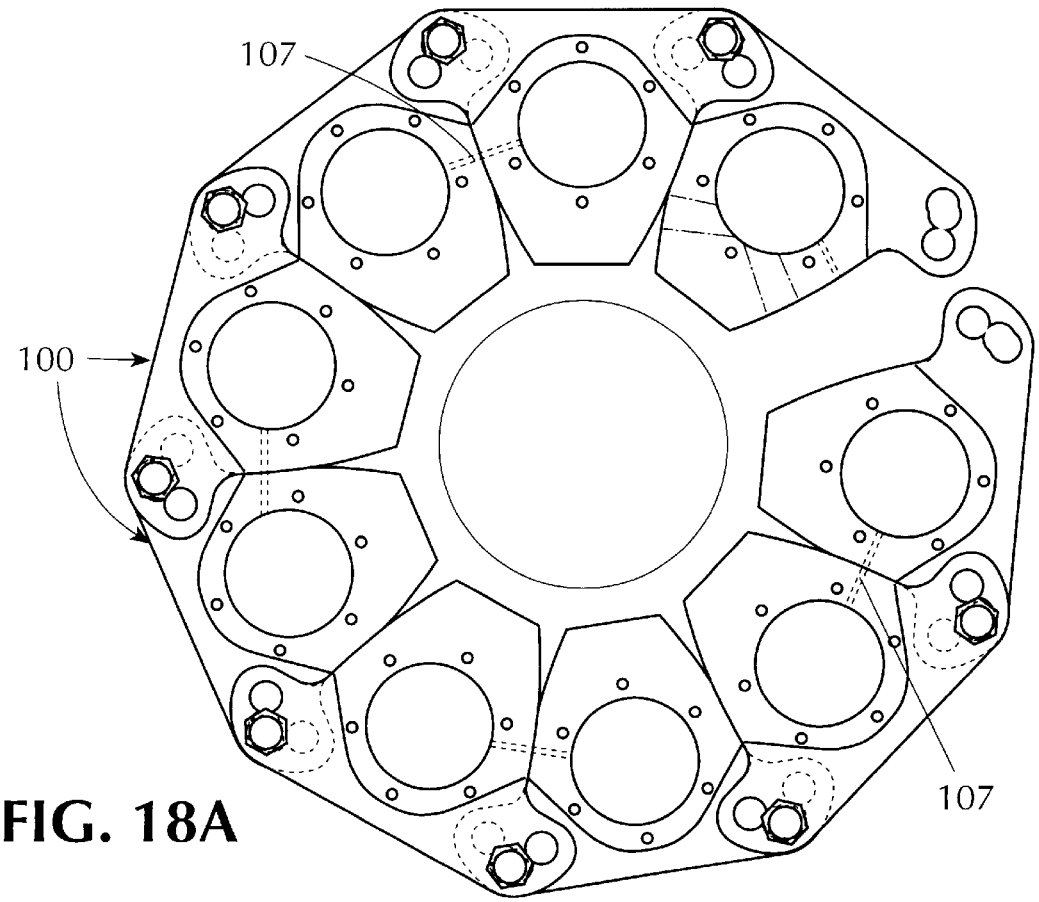
FIG. 18A is a plan view of an interlocked arrangement of friction module bases in accordance with a preferred embodiment of the invention.
Figure 18B:
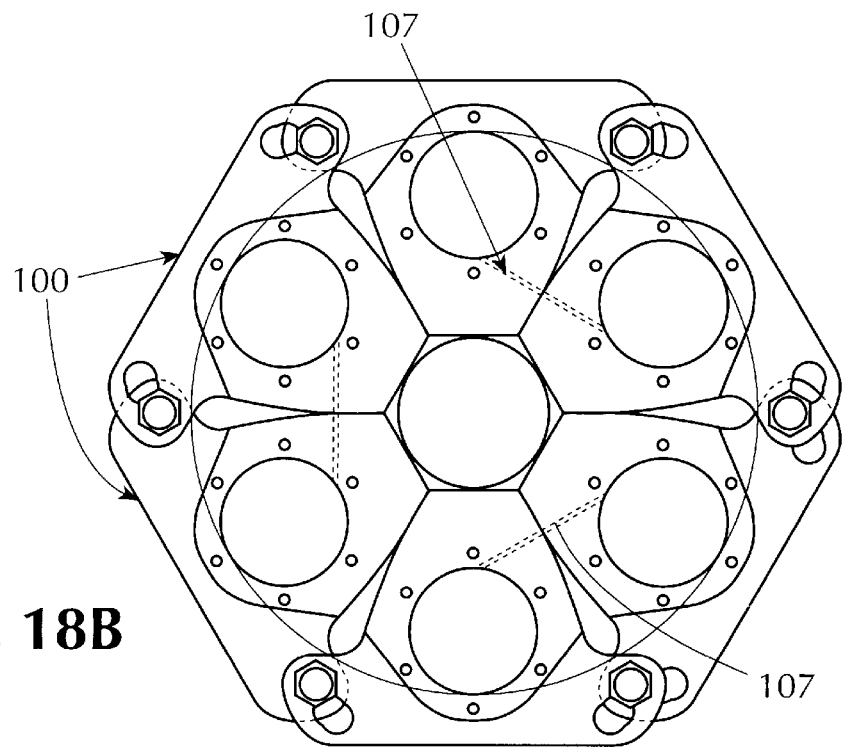
FIG. 18B is a plan view of an interlocked arrangement of friction module bases in accordance with another preferred embodiment of the invention.

FIGS. 18A and 18B show two preferred embodiments of base modules 100 which are constructed similar to the module bases 100A and 100B and connected annularly in an alternate inverse interlocked arrangement to perform braking operations for different size brake assemblies. As illustrated in the figures, the slotted mounting holes and the contoured sides of the modules allow for the same module base to be interlocked in several positions such that selected inclined surfaces are arranged adjacent each other, thereby allowing for braking operations to be performed for various sizes of brake assemblies. In other words, the mating location of the air transfer port 106 on the sides 105 of a module base determines the circumferential size of brake assembly formed from a plurality of module bases interlocked together in an annular arrangement.

Although the sizes of the several parts described and shown may be varied, the thickness of the friction material pads 15 or 61, including the back plate 17, may suitably be about one-half inch, with the other parts being of compatible sizes.

Various modifications, substitutions of parts and/or materials and numerous useful applications will suggest themselves to those acquainted with the art of brakes and clutches, and accordingly are considered to be within the spirit and scope of the invention.

What is claimed is:

1. In combination with a torque collar adapted to be secured to the front of a piston of a friction brake or clutch, a flat, generally trapezoid-shaped mass of friction material with a compact, wider base, a narrower base and side faces inclined toward each other, secured to a generally flat back plate, said back plate including at least one tab extending beyond the wider base and terminating in a lip turned upwardly from the base plate, the torque collar having a pair of torque posts extending from the torque collar at the narrower and wider bases of the generally trapezoid-shaped mass of friction material for restraining the mass of friction material and said back plate against transverse movement.

2. The combination of claim 1 wherein a, the torque legs having inner faces inclined toward each other to embrace the side faces of the generally trapezoid-shaped mass of friction material for restraining the friction material against transverse movement.

3. The combination of claim 2 wherein the inner faces of the torque legs are flat and are inclined toward each other at an angle between about 30° and about 45°.

4. The combination of claim 2 wherein the inner faces of the torque legs are flat and are inclined toward each other at an angle of about 33° to about 34°.

5. The combination of claim 1 and including a retainer clip having portions positioned to abut the wider base of the generally trapezoid-shaped mass of friction material to restrain the friction material against radial movement, said clip portions being movable to an open condition to permit radial movement of the friction material.

6. The combination of claim 5 wherein the retainer clip is generally arcuate in plan and is attached to the torque legs.

7. The combination of claim 5 wherein the clip portions and the friction material are movable by hand.

8. The combination of claim 5 wherein the retainer clip comprises two identical arcuate parts.

9. The combination of claim 5 wherein the retainer clip is a one-piece clip consisting of a continuous arcuate band.

10. The combination of claim 5 wherein the retainer clip has outwardly extending end portions to facilitate bending the clip to an open condition.

11. A friction material pad for use in association with a piston in a friction brake or clutch comprising: a flat, generally trapezoid-shaped, compact, mass of friction material with a wider base, a narrower base, a pair of shoulders, each of said shoulders extending from the narrower base to an inclined first side face and inclined second side faces extending from the wider base to the first side faces, wherein the mass of friction material is secured to a generally flat back plate, said back plate including at least one first tab extending beyond the wider base and terminating in a lip turned upwardly from the base plate.

12. The pad of claim 11 further comprising at least one second tab embedded within the mass of friction material and having a lip turned upwardly from the base plate to a distance equal to a preselected minimum thickness of the friction material resulting from wear, for signaling that the pad should be replaced.

13. The pad of claim 11, wherein the first and second side faces are flat and inclined toward each other.

14. In combination with a torque collar adapted to be secured to the front of a piston of a friction brake or clutch, a flat, generally trapezoid-shaped, compact, mass of friction material with a wider base, a narrower base, a pair of shoulders, each of said shoulders extending from the narrower base to an inclined first side face and inclined second side faces extending from the wider base to the first side faces, wherein the first and second side faces are inclined toward each other, and wherein the mass of friction material is secured to a generally flat back plate, said back plate including at least one first tab extending beyond the wider base and terminating in a lip turned upwardly from the base plate.

15. The combination of claim 14 further comprising a pair of torque legs extending from the torque collar, each of the torque legs having a shoulder, a first inclined inner face extending from the shoulder and a second inclined inner face extending from the first inclined inner face, the shoulder and inner faces of the legs having contours matching the contours of the shoulder and the first and second side faces of the friction material, respectively, such that the shoulder and the inner faces of the torque legs provide for accurate positioning of the friction material in the collar.

16. The combination of claim 15, wherein each of the pair of torque legs includes a first outer surface extending from the shoulder and a second outer surface extending from the first outer surface, the combination further comprising:

a retainer clip having portions positioned to abut the wider base of the friction material and contoured to extend over the shoulders and the first and second outer surfaces of the legs for retaining the clip to the legs and for securing the pad in the collar, said clip portions being movable to an open condition to permit radial movement of the friction material.

17. The combination of claim 16, wherein the clip portions and the friction material are movable by hand.

18. The combination of claim 16, wherein the first and second outer surfaces of each of the legs are generally arcuate in plan and define a recess at the outer surface of the legs, the combination further comprising:

fastening means positioned in said recesses and secured to said collar for retaining the clip secured upon the legs and abutted to the wider base.

19. The combination of claim 16, wherein the clip has outwardly extending end portions to facilitate bending the clip to an open condition.

20. The combination of claim 14 further comprising a pair of torque legs extending from the collar, wherein the first and second side faces of the friction matrial are inclined toward each other at a predetermined angle such that a resultant force produced when the friction material is forced against a leg of the collar during braking operation is directed at least substantially normal to the leg to restrain transverse movement of the pad with respect to the collar.

21. A piston assembly in a friction brake or clutch for use in association with a friction material pad adapted to be secured to a torque collar, said collar adapted to be secured to the front of the piston assembly, wherein said pad comprises a flat, generally trapezoid-shaped, compact, mass of friction material with a wider base, a narrower base and side faces secured to a generally flat back plate, said plate having an inner surface defining a central bore, the piston assembly comprising:

a piston;

a support surface defining a piston receiving aperture for receiving the piston; an indexing surface; and means for resiliently coupling the support surface to the indexing surface, wherein said indexing surface faces the central bore in the back plate when the pad is secured to the collar and the collar is coupled to the piston assembly and is biased by the resilient means in the direction of the central bore of the back plate for aligning and preventing lateral movement of the pad with respect to the piston assembly.

22. The assembly of claim 21, wherein the resilient means is a wave spring.

23. The assembly of claim 21, wherein the indexing surface is in the form of a ring having an outer diameter less than the diameter of the inner surface of the back plate.

24. A friction material module base for receiving a torque collar including a friction material pad, wherein the pad comprises a flat, generally trapezoid-shaped, compact, mass of friction material with a wider base, a narrower base and side faces secured to a generally flat back plate, the module base being generally trapezoid-shaped and comprising:

a generally trapezoid-shaped base plate;

a top plate overlaying the base plate except for side base ends of the base plate, wherein the base plate and the top plate define a piston bore generally at their centers;

at least one inclined side surface at the overlapping portions of the top and bottom plates;

an air port in the at least one inclined side surface; and an air passageway extending from the air port to the piston bore.

25. The module base of claim 24, wherein said air port further comprises a pneumatic seal.

26. The module base of claim 24 further comprising an input air port at the base surface and an air passageway extending from the input air port to the piston bore.

27. The module base of claim 24 further comprising a plurality of inclined side surfaces, wherein at least one of said plurality of side surfaces includes an air port connected to the piston bore via an air passageway.

28. A modular braking apparatus comprising a plurality of friction material module bases arranged adjacent to each other, each of said module bases comprising:

a generally trapezoid-shaped base plate;

a top plate overlaying the base plate except for side base ends of the base plate, wherein the base plate and the top plate define a piston bore generally at their centers and each of the side ends of the base plate define a slotted interlocking region;

at least one inclined side surface at the overlapping portions of the top and bottom plates;

an air port in the at least one inclined side surface; and an air passageway extending from the air port to the piston bore;

wherein the apparatus comprises a coupling means for coupling a first module base to an adjacent second module base in an alternative inverted arrangement at the slotted interlocking regions of the first and second modules bases such that the at least one inclined side surface of the first module base faces and is substantially flush with the at least one inclined side surface of the second module base to provide for mating of the respective air ports on the at least one inclined side surfaces of the first and second module bases.

29. The apparatus of claim 28, wherein at least one of the module bases further comprise an input air port at the base surface and an air passageway extending from the input air port to the piston bore.

* * * * *